(12) United States Patent
Goettler (10) Patent No.: US 11,674,538 B2
(45) Date of Patent: Jun. 13, 2023

(54) FASTENING MECHANISM AND A FURNITURE ASSEMBLY

(71) Applicant: Zhejiang Xinyi Shengao Mechanical Transmission Co, Ltd., Sonjiang (CN)

(72) Inventor: Jacob Goettler, Shanghai (CN)

(73) Assignee: Zhejiang Xinyi Shengao Mechanical Transmission Co. Ltd., Shanghai (CN)

( * ) Notice: Subject to any disclaimer, the term of this patent is extended or adjusted under 35 U.S.C. 154(b) by 998 days.

(21) Appl. No.: 16/447,354

(22) Filed: Jun. 20, 2019

(65) Prior Publication Data

US 2020/0003241 A1 Jan. 2, 2020

(30) Foreign Application Priority Data

Jun. 27, 2018 (CN) .......................... 201810680701.2

(51) Int. Cl.
*F16B 7/04* (2006.01)
*A47B 13/00* (2006.01)
*F16B 2/08* (2006.01)

(52) U.S. Cl.
CPC ............ *F16B 7/044* (2013.01); *A47B 13/003* (2013.01); *F16B 2/08* (2013.01); *A47B 2013/006* (2013.01)

(58) Field of Classification Search
CPC .......... F16B 2/08; F16B 7/044; F16B 7/0446; F16B 7/048; F16B 7/0493; F16B 12/2063; F16B 12/52; A47B 2013/006; A47B 2013/022; A47B 13/003; A47B 13/021
See application file for complete search history.

(56) References Cited

U.S. PATENT DOCUMENTS

| | | | | |
|---|---|---|---|---|
| 41,988 | A * | 3/1864 | Frost | F16B 2/08 |
| | | | | 15/145 |
| 974,462 | A * | 11/1910 | Bissell | F16B 7/0446 |
| | | | | 403/191 |
| 1,245,917 | A * | 11/1917 | Hewitt | F16B 2/08 |
| | | | | 74/557 |
| 2,069,474 | A * | 2/1937 | Erikson | F16B 2/08 |
| | | | | 403/191 |

(Continued)

FOREIGN PATENT DOCUMENTS

| | | | | |
|---|---|---|---|---|
| FR | | 2661459 A1 * | 10/1991 | F16B 2/08 |
| WO | WO-9707358 A1 * | | 2/1997 | E04B 1/585 |

*Primary Examiner* — Matthew R McMahon
(74) *Attorney, Agent, or Firm* — Marshall & Melhorn, LLC (57) ABSTRACT

A fastening mechanism configured to connect a first member to a second member may have a clamp member having an enclosure for enclosing the first member. The mechanism may also have engagement sheets extending from two side edges of the enclosure. Each engagement sheet may have a first engagement portion. The mechanism may also have a locking member having slots where the engagement sheets of the clamp member may be configured to be inserted through the slots. The mechanism may also have an actuating and tensioning device having a main body portion provided with second engagement portions engaged with the first engagement portions, and a force application mechanism affixed to the main body portion for applying a force on the locking member to shift the relative position between the locking member and the clamp member. A furniture assembly using the fastening mechanism is also provided.

5 Claims, 6 Drawing Sheets

(56) References Cited

U.S. PATENT DOCUMENTS

| | | | | |
|---|---|---|---|---|
| 2,107,037 A * | 2/1938 | Kippenberg | ............. | F16B 2/08 248/230.9 |
| 2,391,553 A * | 12/1945 | Decker, Jr. | ............. | F16B 7/044 403/183 |
| 3,268,946 A * | 8/1966 | Case | ................. | F16B 7/0433 16/253 |
| 3,591,211 A * | 7/1971 | Richey | ................ | F16B 7/0493 403/395 |
| 3,972,639 A * | 8/1976 | Lening | ................ | F16B 2/08 403/191 |
| 4,460,142 A * | 7/1984 | O'Rorke | ................ | G09F 7/18 248/230.8 |
| 4,669,911 A * | 6/1987 | Lundgren | ............... | F16B 2/08 24/19 |
| 4,675,952 A * | 6/1987 | Nagano | ................ | B62M 9/135 74/489 |
| 9,200,654 B1 * | 12/2015 | Parduhn | ................ | F16B 2/08 |

\* cited by examiner

FASTENING MECHANISM AND A FURNITURE ASSEMBLY

CROSS-REFERENCE TO RELATED APPLICATIONS

The present application claims the benefit to CN201810680701.2 filed on Jun. 27, 2018, which is incorporated herein by reference in its entirety.

TECHNICAL FIELD

The present invention relates to the field of furniture manufacturing, in particular to a fastening mechanism for connecting two members in a piece of furniture.

BACKGROUND ART

In the existing furniture, especially the furniture such as a desk comprising legs, a desktop portion supported by the legs, and a partition serving as a screen, the partition is supported by a support frame, and the support frame is fixed to the legs. This support frame requires a relatively high strength to support the partition. To this end, threaded fasteners are often used in the prior art to connect the two members together.

However, the use of a threaded fixing structure requires an opening in the leg of the furniture, and once the position of the opening is fixed, the relative position between the support frame and the leg is also fixed.

However, at present, there are higher assembly flexibility requirements for office furniture, and a more convenient on-site assembly is also desired. Therefore, it is desirable to provide an alternative to the original threaded fastening structure.

SUMMARY OF THE INVENTION

In order to overcome the disadvantage of the fastening mechanism for connection in the furniture in the prior art, the present invention provides a fastening mechanism configured to connect a first member to a second member, the fastening mechanism comprising: a clamp member having an enclosure for enclosing the first member, and engagement sheets extending from two side edges of the enclosure, the engagement sheet being provided with a first engagement portion; a locking member having slots, the engagement sheets of the clamp member being configured to be able to be inserted through the slots; and an actuating and tensioning means, wherein the actuating and tensioning means comprises: a body portion provided with a second engagement portion engaged with the first engagement portion of the engagement sheet, and a force application mechanism attached to the body portion for applying a force on the locking member to shift a relative position between the locking member and the clamp member.

According to an aspect of the present invention, the force application mechanism comprises a screw and a nut, the screw being inserted into a channel provided in the body portion of the actuating and tensioning means and being screwed to the nut.

According to another aspect of the present invention, the first engagement portion comprises holes provided in the engagement sheets, the second engagement portion comprises raised portions provided on opposite sides of the body portion of the actuating and tensioning means, and the raised portions are configured to be snap-fitted into the holes.

According to another aspect of the present invention, the engagement sheet of the clamp member has a first portion extending from an edge of the enclosure and a second portion extending from the first portion, wherein the first portion is arranged inside the slot of the locking member, and the first engagement portion is arranged on the second portion.

According to still another aspect of the present invention, a pair of the first portions of the engagement sheets respectively extends from the side edges of the enclosure and is gradually close to each other, and a pair of the second portions extending from the first portions is parallel to each other.

According to still another aspect of the present invention, the locking member has a flared portion, the flared portion faces toward the enclosure of the clamp member, and an inner wall surface of the flared portion engages with the first portions of the engagement sheet.

According to still another aspect of the present invention, the flared portion has oppositely-extending side walls, an inner surface of the side wall is provided with a flange, and an inner edge of the flange engages with the outer edge of the engagement sheet.

According to still another aspect of the present invention, the locking member and the actuating and tensioning means are provided with guide mechanisms mating with each other.

According to still another aspect of the present invention, a connection portion for fixing the second member is arranged on the body portion.

In addition, the present invention further provides a furniture assembly, which comprises a first furniture member and a second furniture member, wherein one of the first furniture member and the second furniture member is an elongated member; and the clamp member of the fastening mechanism as described above is sleeved over the elongated member such that the enclosure encloses an outer peripheral surface of the elongated furniture member at a predetermined position, and the fastening mechanism is connected to the other of the first furniture member and the second furniture member.

In addition, the invention further provides a furniture assembly, which comprises: furniture legs; and a supporting frame fixedly connected to the furniture legs via the fastening mechanisms as described above; wherein the enclosure encloses an outer peripheral surface of at least one of the furniture legs at a predetermined height of the furniture leg.

With the fastening mechanism according to the present invention, the supporting frame can be fixed to the leg without punching eyelets for screws on the furniture leg, and the height thereof can be freely adjusted. The furniture using the fastening mechanism of the present invention is more beautiful, and the whole assembly process is convenient and flexible.

With the fasten mechanism according to the present invention, the clamping force of the clamp member applied to the outer surface of the leg can firmly fix the support frame to the leg, and its reliability is better than that of conventional threaded fasteners.

BRIEF DESCRIPTION OF THE DRAWINGS

The subject matter of the present invention and its various advantages can be more completely understood with reference to the following detailed description, and reference is made to the accompanying drawings, in which.

REFERENCE NUMERALS 1 desk
2 desktop portion
3 leg
5 support frame
6 Partition
10 fastening mechanism
20 clamp member
21 enclosure
22 engagement sheet
221 first portion
222 second portion
23 hole
30 locking member
31 slot
32 flared portion
321 side wall
33 flange
35 body
38 groove
40 actuating and tensioning means
41 body portion
42 channel
43 raised portion
431 recess
45 connection portion
461 screw
462 nut
47 flange portion

DETAILED DESCRIPTION OF EMBODIMENTS

The present invention will be further described below in conjunction with particular embodiments and the accompanying drawings, and more details are explained in the following description for the ease of fully understanding the present invention; however, the present invention can obviously be implemented in various different manners than that described herein, a person skilled in the art can make an similar extension and deduction without departing from the connotation of the present invention according to the practical applications, and therefore the scope of protection of the present invention should not be limited to the content of the particular embodiments herein.

Figure 1:
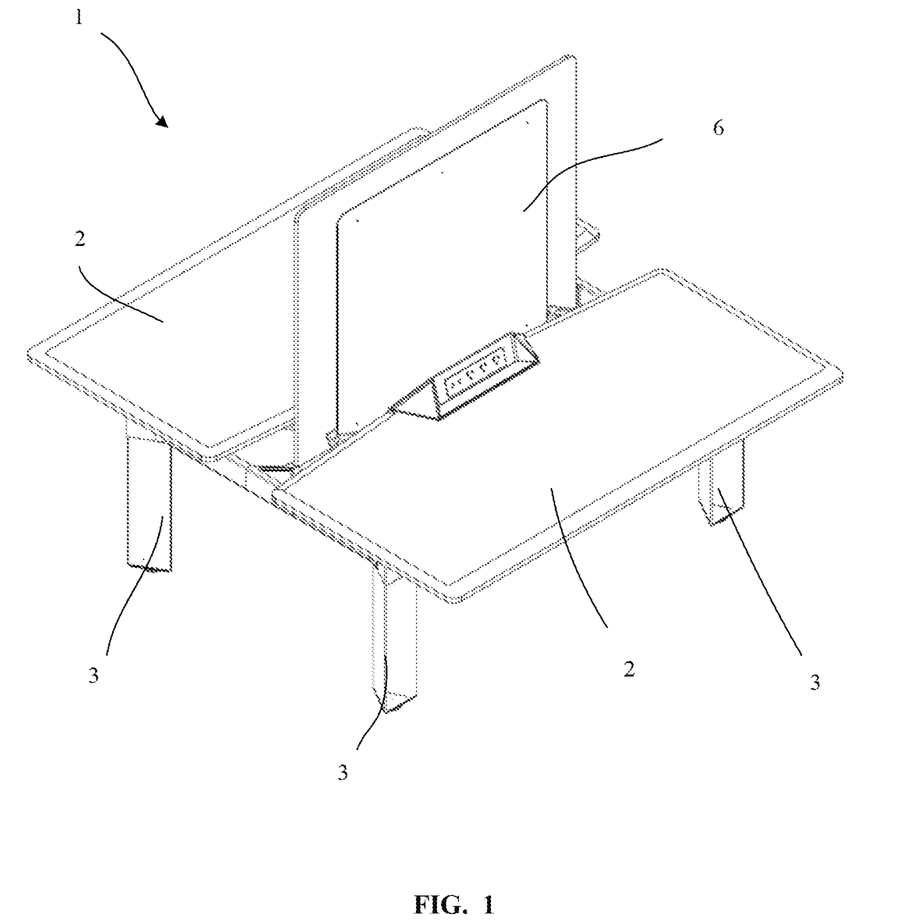
FIG. 1 shows a front perspective view of a desk using a fastening mechanism according to the present invention.
Figure 2:
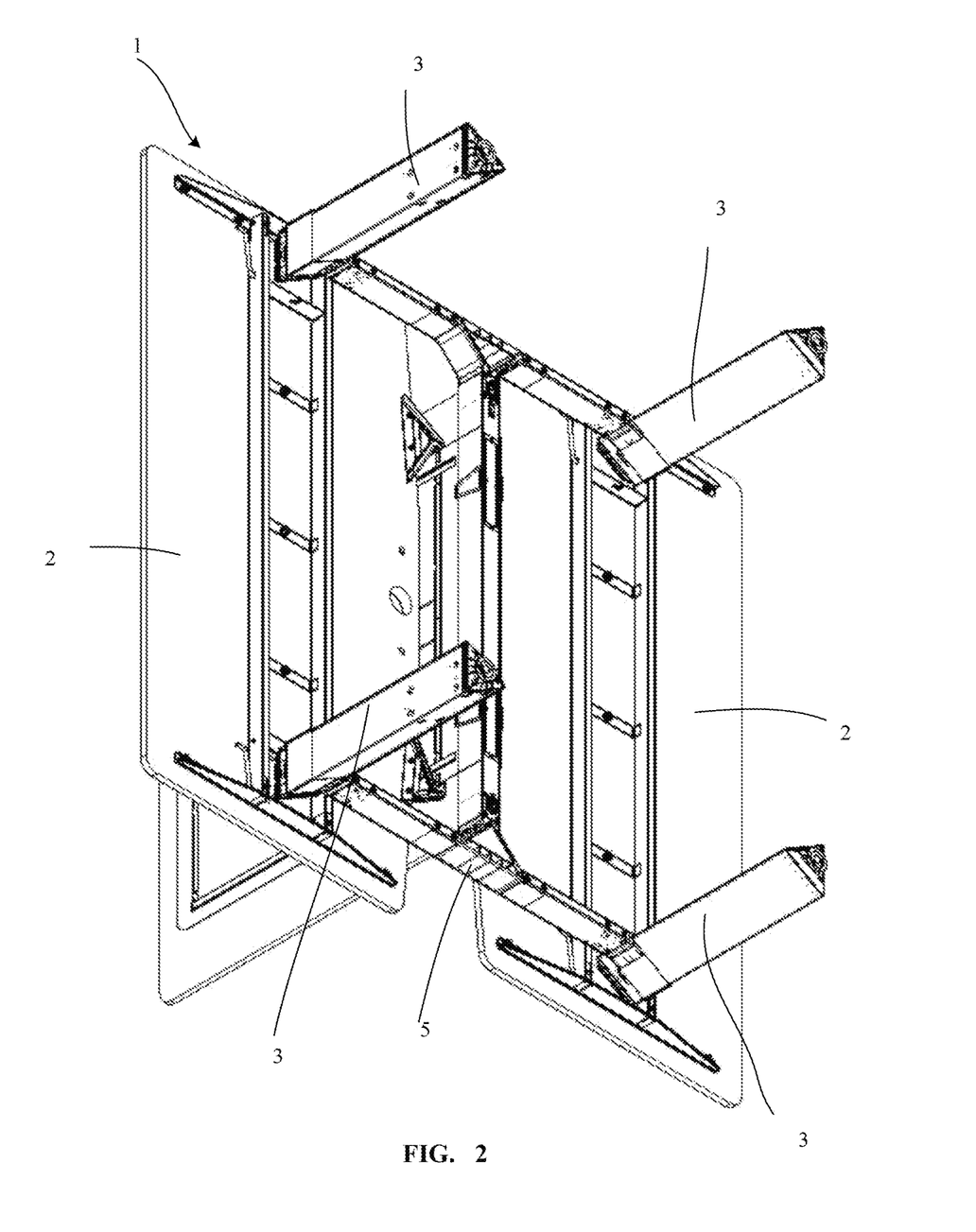
FIG. 2 shows a bottom perspective view of the desk using the fastening mechanism according to the present invention.

FIG. 1 shows a front perspective view of a desk 1 using a fastening mechanism 10 according to a preferred embodiment of the present invention, while FIG. 2 shows a bottom perspective view of the desk 1 using the fastening mechanism 10 according to the preferred embodiment of the present invention. In this embodiment, the fastening mechanism 10 is used in the desk 1 to fix a support frame 5 therein to each leg 3. It should be understood that the preferred embodiment takes the desk 1 as an example, and in particular, with the fastening mechanism 10 of the present invention, the furniture legs 3 can be connected to the support frame 5 to form a furniture assembly. However, it should be understood that the fastening mechanism 10 of the present invention is also applicable to other occasions where two members need to be connected to each other in the furniture, preferably one of the two members is an elongated member of a substantially continuous profile, and a clamp member is adapted to be sleeved over the elongated member.

In particular, as shown in FIGS. 1 and 2, the desk 1 is provided with two desktop portions 2 and four legs 3, every two legs 3 supporting one of the desktop portions 2. The desk 1 further comprises a support frame 5, wherein the support frame 5 is configured for supporting a partition 6 serving as a screen, and conductive wires are arranged along the support frame 5. As can be seen from FIG. 2, the supporting frame 5 is substantially I-shaped, and has two oppositely-arranged side beams and a main beam extending between the side beams, and the main beam may be provided with an electrical connector. An end of each side beam is firmly fixed to each leg 3 via a fastening mechanism 10, thereby forming an entire supporting structure for supporting the desktop portions 2 and the partition 6. In the structure shown in FIG. 2, the fastening mechanism 10 is connected to one end of the leg 3 that is close to the desktop portion 2, but this is only an example, and the fastening mechanism 10 may be selectively fixed to the leg 3 at any height.

Figure 3:
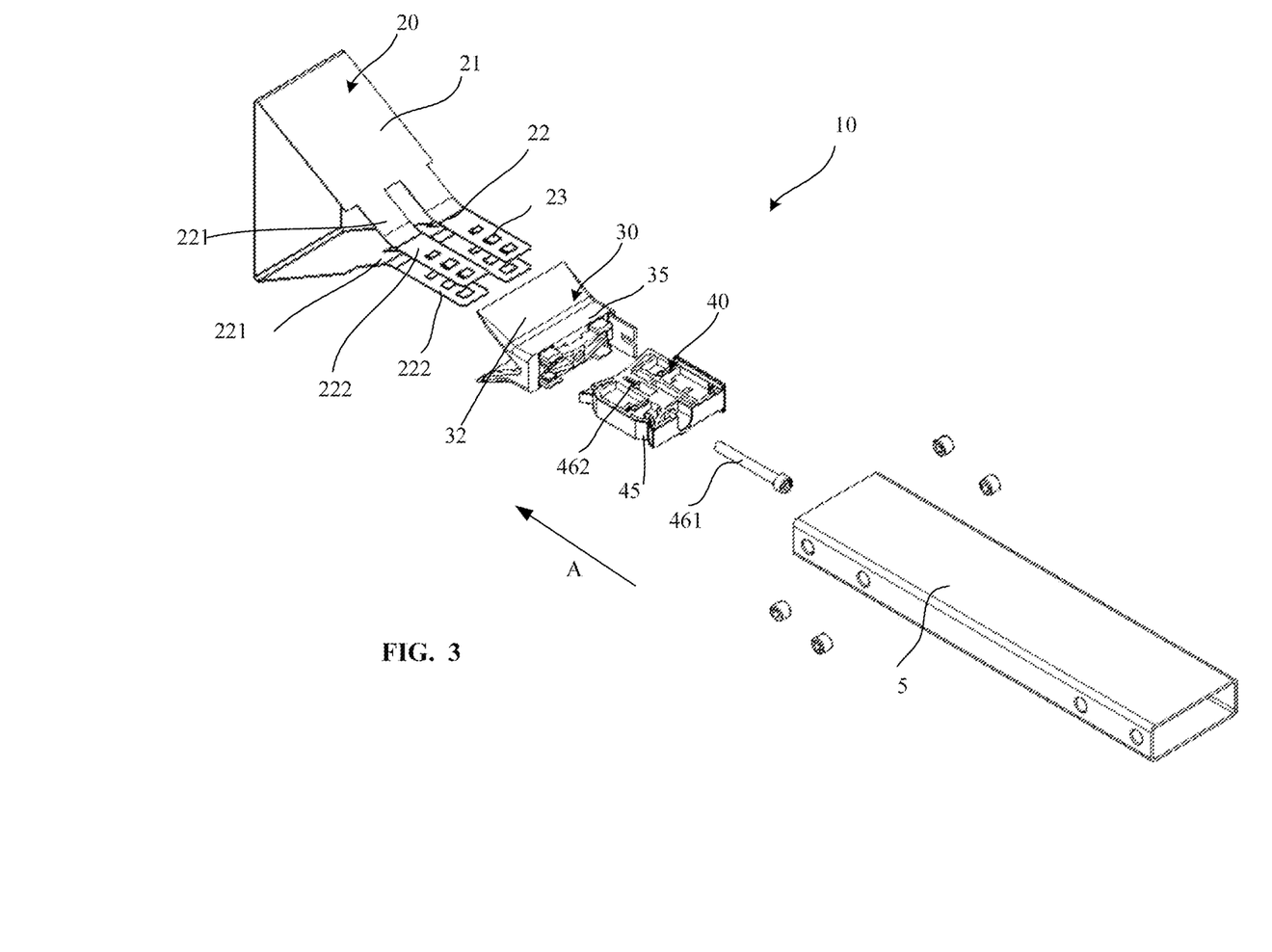
FIG. 3 shows an exploded perspective view of a fastening mechanism according to a preferred embodiment of the present invention.

FIG. 3 shows an exploded perspective view of a fastening mechanism 10 according to an embodiment of the present invention. The fastening mechanism 10 comprises a clamp member 20, a locking member 30, and an actuating and tensioning means 40. In general, the clamp member 20 is connected to the leg 3, while the actuating and tensioning means 40 is connected to at least part of the support frame 5. The locking member 30 is associated to and makes contact with the clamp member 20 and the actuating and tensioning means 40, respectively, the clamp member 20 is inserted into the locking member 30 and is then connected to the actuating and tensioning means 40, and the locking member 30 is used to transmit the force applied by the actuating and tensioning means 40 to the clamp member 20 and converts same into a clamping force of the clamp member 20.

Figure 4:
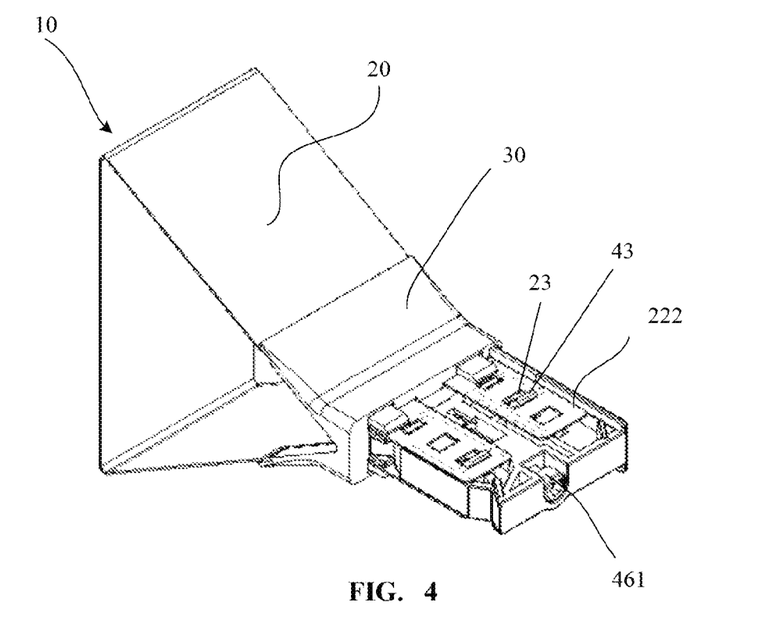
FIG. 4 shows a perspective view of a fastening mechanism according to a preferred embodiment of the present invention in a assembled state.

As shown in FIGS. 3 and 4, the clamp member 20 has an enclosure 21 for enclosing the leg 3 and engagement sheets 22 extending from two side edges of the enclosure 21. As shown in FIG. 3, in the preferred embodiment, two engagement sheets 22 with substantially equal widths extend from each side edge, and the two engagement sheets 22 are spaced apart by a distance to facilitate insertion into corresponding slots 31 in the locking member 30. In addition, the edge of the engagement sheet 22 is not in line with the edge of the enclosure 21 in a direction parallel to a force application direction A, so that the edge of the enclosure 21 forms an angle with respect to the edge of the engagement sheet 22. The engagement sheet 22 is further provided, with a plurality of holes serving as first engagement portions which are adapted to engage with corresponding second engagement portions such as raised portions 43 on the actuating and tensioning means 40. In a preferred embodiment, three holes 23 are provided in each engagement sheet 22.

The clamp member 20 is preferably made of a metal sheet, and preferably, the clamp member 20 may be integrally formed by, for example, a stamping process. The shape of the enclosure 21 corresponds to that of the leg 3. In FIG. 3, it can be seen that the enclosure 21 of the clamp member 20 comprises three angled portions for corresponding attachment to three surfaces of the leg 3, which has a triangular cross-section as shown in FIG. 2.

In addition, the engagement sheet 22 of the clamp member 20 further comprises a first portion 221 extending from the side edge of the enclosure 21 and a second portion 222 extending from the first portion 221, wherein the first portion 221 of the engagement sheet 22 is a portion that is arranged in the slot 31 of the locking member 30 when the fastening mechanism 10 is in use, and the second portion 222 is provided with the holes 23 as the first engagement portions to mate with the actuating and tensioning means 40. As shown in FIG. 3, pairs of the first portions 221 of the engagement sheets 22 respectively extend from the two side edges of the enclosure 21 and gradually approach each other, and the two second portions of each pair of the second portions 222 extending from the first portions 221 are parallel to each other.

Figure 5:
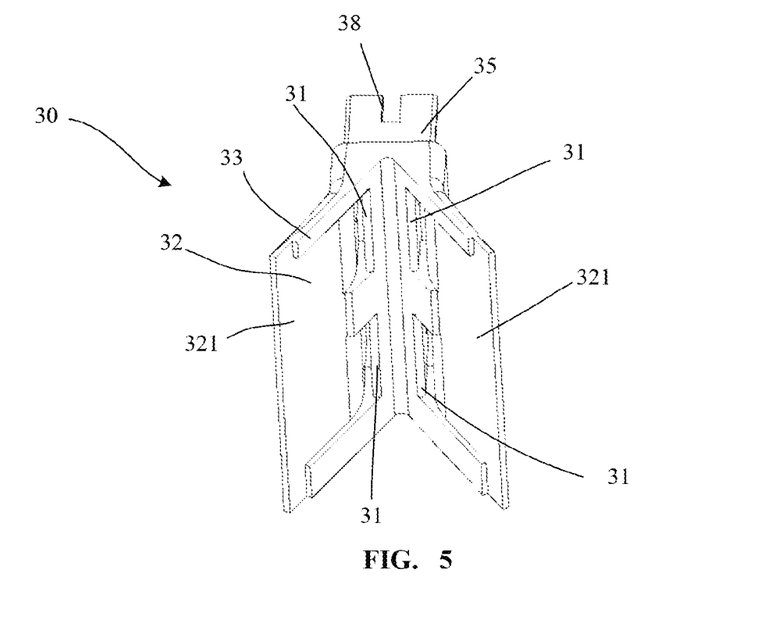
FIG. 5 shows a perspective view of a locking member.

As shown in FIG. 5, the locking member 30 has a body 35 and a flared portion 32. The slots 31 are arranged in the body 35, and in a preferred embodiment, corresponding to the four engagement sheets 22, four slots 31 are arranged in the body 35. These slots 31 penetrate the body 35 of the locking member 30, and the engagement sheet 22 can be inserted from one end of the slot 31 and pass out of the other end of the slot 31. In addition, the locking member 30 has a flared portion 32, which faces toward the enclosure 21 of the clamp member 20 when the fastening mechanism 10 is in a state of engagement and use, and an inner wall surface of the flared portion 32 engages with the first portion 221 of the engagement sheet 22.

Preferably, the flared portion 32 comprises side walls 321 that extends in opposite positions and further comprises flanges 33 at two opposite side edges of the side walls 321, and in the state of use, inner edges of the flanges 33 engage with outer edges of the engagement sheets 22 to act as a guide. As can be seen from FIG. 5, the flange 33 does not extend to an end of the flared portion 32 that directly faces toward the side edge of the enclosure 21, but is indented to be held back by a certain distance so as to abut against an end edge of the enclosure 21 at a corresponding position to form a stop structure.

In a preferred embodiment, the locking member 30 is integrally formed of a metal and has a sufficient rigidity to transmit the locking force to the clamp member 20.

As shown in FIG. 3, the actuating and tensioning means 40 in the fastening mechanism 10 has a main body portion 41 and a force application mechanism, wherein the main body portion 41 is provided with the second engagement portion engaged with the first engagement portion of the engagement sheet 22, and the force application mechanism is attached to the main body portion 41 for applying a force on the locking member 30 to shift a relative position between the locking member 30 and the clamp member 20.

Figure 6:
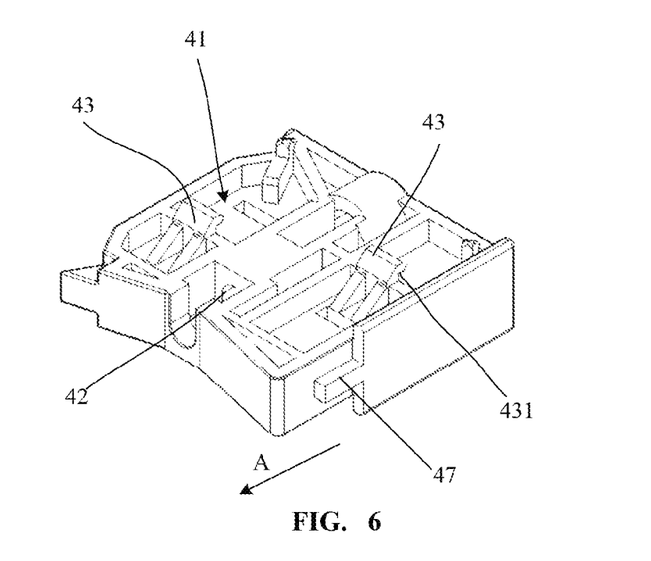
FIG. 6 shows a perspective view of a body portion of the actuating and tensioning means.

Specifically, as shown in FIG. 6, the main body portion 41 of the present invention is substantially shaped to be a block with one end adapted to engage with the locking member 30 and is adapted to be received into a hollow chamber of the support frame 5 as shown in FIG. 3. Raised portions 43 are provided on two opposite side surfaces of the body portion 41 to serve as the second engagement portions. As shown in FIG. 6, two raised portions 43 are arranged on one side surface of the main body portion 41, and the two raised portions 43 are respectively used for engaging the two engagement sheets 22 extending from one side edge of the enclosure 21, and the two raised portions 43 are staggered one after the other in the force application direction A.

The height of these raised portions 43 in a direction toward the enclosure 21 gradually decreases, and when the engagement sheet 22 is inserted, the engagement sheets 22 are guided to pass through top surfaces of the raised portion 43, so that the raised portions 43 and the designated hole 23 in the second portion 222 of the engagement sheet 22 are engaged in a snap-fit fashion. The side of the raised portion 43 that is opposite the enclosure 21 is preferably provided with a recess 431. As shown in FIG. 4, when the raised portion 43 is snap-fitted in the hole 23, an edge of the hole 23 will be snap-fitted in the recess 431 and the raised portion 43 is not easily disengaged from the hole 23 in the case of applying force.

In addition, the main body portion 41 is further provided with some reinforcing ribs to increase strength of the main body portion 41 itself.

On the other hand, as shown in FIG. 3, the force application of the actuating and tensioning means 40 in the preferred embodiment involves a screw 461 and a nut 462. The screw 461 is inserted into a channel 42 provided in the main body portion 41 of the actuating and tensioning means 40, and an operating end of the screw 461 is operable at the opening end of the channel 42 of the main body portion 41. The nut 462 is arranged in the main body portion 41 on the side of the main body portion 41 of the actuating and tensioning means 40 that is close to the locking member 30. Generally, the position of the nut 462 relative to the main body portion 41 is fixed, and the screw 461 can be retracted from and extend into the main body portion 41 along with a rotation of the screw relative to the nut 462.

A channel 42 on the main body portion 41 for having the screw 461 inserted therein is arranged at a substantially middle position of the body portion 41 so as to uniformly apply the force to the locking member 30.

In addition, the actuating and tensioning means 40 may further comprise connection portions 45 configured to be connected to the frame 5, and in the embodiment shown in FIG. 3, the connection portions 45 are arranged on surfaces of two sides of the body portion 41 that are parallel to the force application direction A, and may be specifically formed as recesses or screw holes. Alternatively, in other embodiments, the main body portion 41 may be connected to the support frame 5 via a snap-fit structure. In other embodiments, it is also possible to directly fix the connected construction such as the support frame 5 to the locking member 30.

Further, a matching guide mechanism may be provided at a position between the actuating and tensioning means 40 and the locking member 30. For example, in the locking member 30 shown in FIG. 5, a groove 38 is provided on a side of the locking member close to the actuating and tensioning means 40, and in order to mate with the groove, as shown in FIG. 6, a flange portion 47 is provided on a side of main body portion 41, in the state of use, the groove and the flange portion will cooperate with each other to mate the actuating and tensioning means 40 with the locking member 30.

The fastening mechanism 10 according to the present invention is used as follows.

Before use, the clamp member 20, the locking member 30 and the actuating and tensioning means 40 of the fastening mechanism 10 are separated from one another. First, the clamp member 20 is slightly opened from the free side edges of the engagement sheets 22 so as to sleeve the clamp member 20 over the leg 3 at an appropriate height, and the enclosure 21 is attached to an outer surface of the leg 3. Next, the engagement sheets 22 are inserted into the slots of the locking member 30 so that the locking member 30 move as close as possible to the leg 3, and the second portions 222 of the engagement sheets 22 protrude out of the locking member 30. Subsequently, the actuating and tensioning means 40 is inserted between the two opposite engagement sheets 22, and the raised portions 43 are snap-fitted into the holes 23. It should be noted that the engagement sheets 22 are flexible, the raised portions 43 can thus be easily snap-fitted into the holes 23, and at this time the screw 461 in the actuating and tensioning means 40 has been pre-connected to the nut 462, but an actuating end of the screw 461 does not protrude from the main body portion 41. Finally, the screw 461 is actuated using a tool, the actuating end of the screw 461 protrudes out of the main body portion 41 and acts on the locking member 30, and the actuating and tensioning means 40 enables the engagement sheets 22 to further protrude out of the slots of the locking member 30 in a direction opposite the force application direction by means of the mating of the holes 23 and the raised portions 43, so that the clamp member 20 tightly clamps the outer surface of the leg 3.

If the support frame and the legs need to be removed, the above steps can be performed in reverse. With the fastening mechanism 10 of the present invention, when the fastening mechanism is removed from the leg and adjusted to another height position, no fastener mounting holes will be left on the leg.

With the fastening mechanism 10 according to the present invention, the supporting frame 5 can be fixed to the leg 3 without punching eyelets for screws on the leg 3, and the height thereof can be freely adjusted. The whole assembly process is convenient and flexible.

With the fastening mechanism 10 according to the present invention, the clamping force of the clamp member 20 applied to the outer surface of the leg 3 can firmly fix the support frame 5 to the leg, and its reliability is better than that of conventional threaded fasteners.

Figure 7:
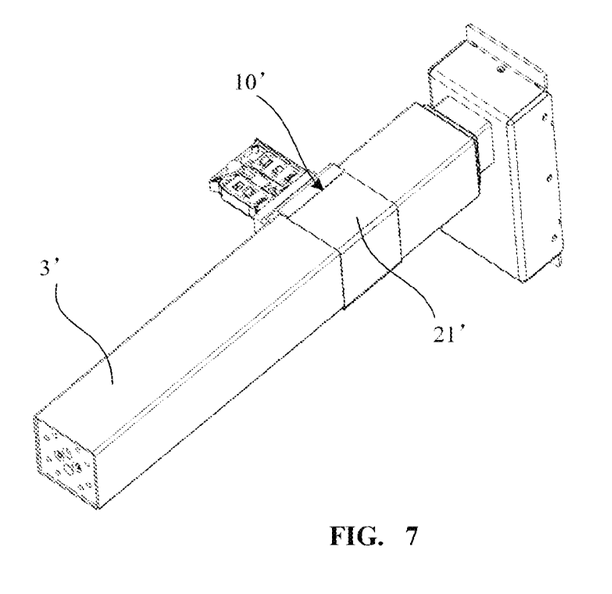
FIG. 7 shows a perspective view of a leg using a fastening mechanism according to another preferred embodiment of the present invention.
Figure 8:
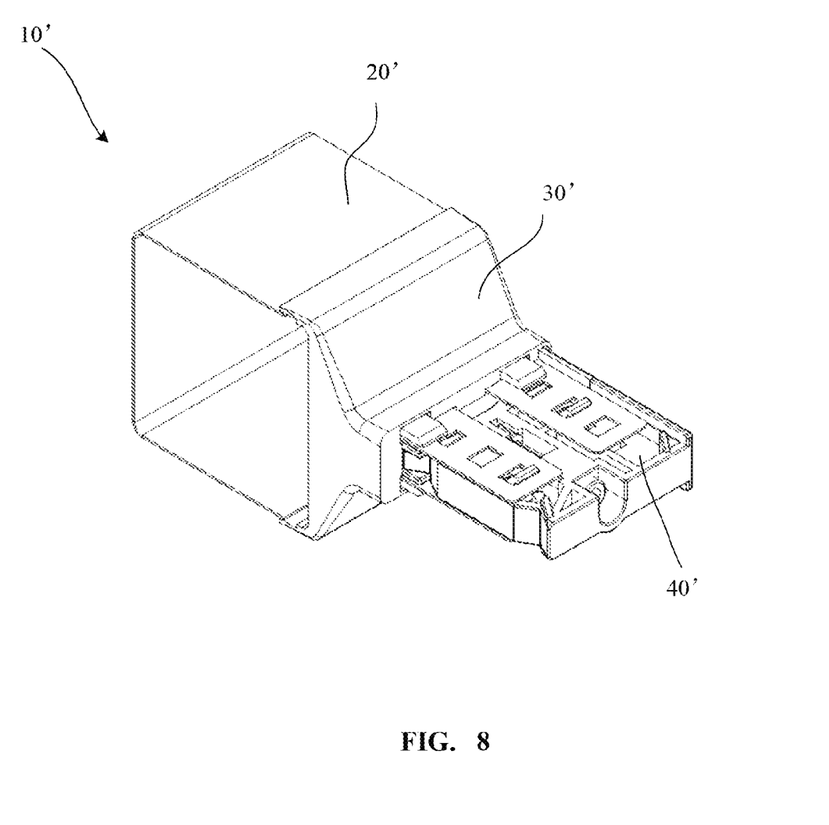
FIG. 8 shows a perspective view of a fastening mechanism according to another preferred embodiment of the present invention.

The present invention may also be in other variations. For another fastening mechanism 10' as shown in FIGS. 7 and 8, the enclosure 21' of the clamp member 20' is formed in a square shape and comprises three parts formed at right angles to each other, and is thus adapted to be fixed to the leg 3' with a square cross-section. The locking member 30' and the actuating and tensioning means 40' in the fastening mechanism 10' are substantially similar to those in the previous embodiment. In addition, it should be understood that the fastening mechanism with an enclosure formed in the shape of a circle or an ellipse should also be encompassed within the scope of the present invention. In addition, a liner can be additionally arranged on the inner side of the enclosure to further protect the surface of the leg.

The present invention has been disclosed above in terms of the preferred embodiments which, however, are not intended to limit the present invention, and any person skilled in the art could make possible changes and alterations without departing from the spirit and scope of the present invention. Hence, any alterations, equivalent changes and modifications which are made to the above-mentioned embodiments in accordance with the technical substance of the present invention and without departing from the content of the technical solutions of the present invention, will fall within the scope of protection defined by the claims of the present invention.

The invention claimed is:

1. A fastening mechanism, the fastening mechanism being configured to connect a first member to a second member in a piece of furniture, wherein the fastening mechanism comprises:
    a clamp member having an enclosure for enclosing the first member, and engagement sheets extending from two side edges of the enclosure, each of the engagement sheets is provided with a first engagement portion, and each of the engagement sheets of the clamp member includes a first portion extending from the side edge of the enclosure, wherein a pair of the first portions of the engagement sheets respectively extend from the side edges of the enclosure and are gradually close to each other, and a second portion extends from each first portion, wherein a pair of second portions extending from the first portions are parallel to each other;
    a locking member having slots, the engagement sheets of the clamp member being configured to be able to be inserted through the slots, wherein the first portion is configured to be inserted into the slots of the locking member, and the first engagement portion is arranged on the second portion; and
    an actuating and tensioning means comprising:
        a body portion provided with a second engagement portion engaged with the first engagement portion of the engagement sheets and a connection portion for fixing the second member, and
        a force application mechanism attached to the body portion for applying a locking force on the locking member to shift a relative position between the locking member and the clamp member, wherein the force application mechanism comprises a screw and nut, the screw being inserted into a channel provided in the body portion of the actuating and tensioning means and being screwed to the nut,
    wherein the locking member has a flared portion, the flared portion faces toward the enclosure of the clamp member and an inner wall surface of the flared portion engages with the first portions of the engagement sheets.

2. The fastening mechanism of claim 1, wherein the first engagement portion comprises holes provided in the engagement sheets, the second engagement portion comprises raised portions provided on opposite sides of the body portion of the actuating and tensioning means, and the raised portions are snap-fitted into the holes.

3. The fastening mechanism of claim 1, wherein the flared portion has oppositely-extending side walls, the inner wall surface of each side wall is provided with a flange, and an inner edge of each flange engages with an outer edge of a respective engagement sheet.

4. The fastening mechanism of claim 1, wherein the locking member and the actuating and tensioning means are provided with guide mechanisms mating with each other.

5. A furniture assembly comprising a first furniture member, a second furniture member, and a fastening mechanism according to any one of the claims 1, 2 and 3-4:
    wherein one of the first furniture member and the second furniture member is an elongated member; and the clamp member of the fastening mechanism is sleeved over the elongated member such that the enclosure encloses an outer peripheral surface of the elongated member at a predetermined position, and the fastening mechanism is connected to the other of the first furniture member and the second furniture member.

\* \* \* \* \*